Patented Nov. 26, 1946

2,411,725

UNITED STATES PATENT OFFICE 2,411,725

CARROTING OF ANIMAL FIBERS

Alfred E. Hodshon, Lahaska, and Harold H. Tucker, Merion Station, Pa., assignors to John B. Stetson Company, Philadelphia, Pa., a corporation of Pennsylvania No Drawing. Application December 20, 1943, Serial No. 514,976

9 Claims. (Cl. 8—112)

This invention relates to the treatment of animal fibers, such as wool and fur, to develop their felting properties.

The felting qualities of untreated animal fibers are in general inadequate for such purposes as the production of hats. The practice for many years has consequently been to subject fur to a chemical treatment, which is commonly termed carroting, to enhance or produce the desired felting characteristic. Ordinarily the carroting is done prior to separation of the fur from the skin by brushing a suitable carroting solution on the fur. After drying or aging, or both, according to preferred practice, the fur is removed from the skin and processed into felt.

The procedure just alluded to is usually termed hand carroting. It required hand operation and is evidently a relatively slow procedure, particularly where great numbers of pelts are handled. Considerable space is required also for the handling and storage of the furs to permit the carrot to exert its desired effect. Moreover, some carrots contain toxic agents, such as mercury salts, or acids that are corrosive or may cause dermatitis, for which reason hand carroting is further undesirable. For these and other reasons it would be desirable to first remove the fur from the skin and then carrot it by immersion in a solution of the carroting agent, which is termed pot carroting. Thus a large amount of hand labor could be eliminated with attendant economy and other benefits, such as more assured standardization of result. Pot carroting would be desirable also because it would make it practical to use a great deal of fur cut from the pelt which is a by-product of the fur dressing and garment trade, as well as other animal fibers which up to the present time have not been adapted for the manufacture of high quality hats because the felting rates of these fibers are too slow.

The desirability of pot carroting has resulted in many proposals but so far as we are aware none has been commercially successful. A major reason for this is that the carroting solutions proposed heretofore cause the fibers to felt while immersed in them. Consequently after the fur has been dried it has to be treated to loosen the masses of fiber. This is not accomplished satisfactorily, and losses may be so great as to be uneconomical. More serious, however, is the fact that no matter how pot carroted fur is dried the fibers in the centers of the felted masses become seriously damaged due, apparently, to the fact that the masses dry from the outside inwardly so that the carroting chemicals become concentrated sufficiently to act harmfully upon the fibers to an extent such that they are inapplicable to most felting uses. If it is attempted to wash the chemicals out with running water the subsequent felting rate of the fur may be substantially depreciated and, in any event, the washing operation increases the matting of the fibers and makes it more difficult to break up the mats to produce loose fiber. Another factor that has militated against pot carroting is the fact that, as practiced heretofore, the fibers become harsher than is the case with hand carroting.

Pot carroting has especially been objectionable in the case of wool, which is inherently harsh but which assumed a harsher feeling when pot carroted according to prior proposals. This is particularly objectionable because the harsher feeling makes wool felt hats inferior in sales appeal. Also, when combed or straightened wool is pot carroted, it regains its natural kink, and this combined with the felting action that naturally occurs in prior pot carroting makes the subsequent process of cutting the wool into staple lengths a difficult operation.

Wool felt hats have not been particularly acceptable to wearers, partly because of the harsh feel mentioned above. Also, they are heavier than fur felt hats, the felt is not so tight as in a fur felt hat, and the hat will not hold its shape unless loaded with stiffening agent in both brim and crown, wherefore they have a set shape and will not drape. Another serious disadvantage is that wool felt hats have a tendency to shrink when wet while fur felt hats do not. The foregoing defects result from the method of manufacture of wool hats which in turn is dependent upon the fact that the felting rate of wool is not naturally great enough to permit hats to be made entirely of wool by the fur felt hat practice.

More in detail, in fur felt manufacture the fur is deposited on a large cone as a very thin layer. The subsequent hardening and shrinking operations greatly reduce the size of the cone, and greatly increase the thickness, strength and tightness of the felt. The result is a light-weight felt which has undergone practically all of the shrinkage that is possible. Wool, on the other hand, is passed through a carding machine and wound in multiple layers upon a conical head which produces a cone that is close to final size, except that it is very thick. The subsequent felting operations greatly reduce the thickness of the felt but do not substantially decrease the other dimensions of the cone.

It is among the objects of this invention to provide carroting compositions which are applicable to the treatment of animal fibers, such as wool and fur, which produce satisfactory felting rates, are of simple composition, may be varied widely in composition and with respect to the particular carroting agent or agents used, are easy to use, and are applicable particularly to pot carroting. A further object is to provide carroting solutions which embody the foregoing object and are adapted to the treatment of wool to increase its felting rate to a point where it can be used for making hats on regular fur felt hat machinery, which do not cause or increase its kinkiness, and do not increase the harshness of the felt.

A still further object is to provide a method of pot carroting animal fibers, particularly fur and wool, which produces satisfactory felting qualities, in which a wide variety of carroting agents may be used, which avoids matting of the fibers, fiber damage, and other disadvantages met previously in pot carroting, is simple and easily practiced, and which does not harshen the fibers or cause wool fibers to kink.

Yet another object is to provide a method of this type which is applicable to the development of felting qualities in grades and types of fur not previously utilizable in the manufacture of fur felts, or which could be used only in small quantities.

A particular object is to provide a method of pot carroting fur which embodies the foregoing advantages and additionally causes the felt to be self-healing if small holes or related defects appear during the forming of the felt.

Still another object is to provide a method of carroting wool which embodies the foregoing advantages, does not cause the wool to kink and renders it adaptable to manufacture of hats according to regular fur felting practice.

Other objects will be recognized from the following specification.

We have discovered, and it is upon this that the invention is predicated, that the objects of the invention are realized by the use of non-aqueous, or organic, solvents in carroting. Thereby as we have amply demonstrated, it becomes possible to pot carrot animal fibers, such as loose fur and wool, while avoiding the troubles encountered heretofore in pot carroting. We find, moreover, that in this way it is possible to use grades or types of fibers, or amounts of them, which could not be used before either because of their low felting rate or because of the inability to carrot them satisfactorily. Particularly, we find that in this way wool may be carroted to greatly improve its felting rate without increasing its harshness and without restoring kinkiness to combed wool. We find, moreover, that the invention is applicable generally to the various carroting reagents that have been used in the past.

A wide variety of organic solvents of different types may be utilized in the practice of the invention. Thus, we have used satisfactorily such aliphatic and aromatic hydrocarbon solvents as Solvesso No. 2, which is a petroleum hydrocarbon solvent sold under that trade-name by the Standard Oil Company, and xylene. Similarly, we have used a variety of alcohols including methyl, ethyl, n-butyl, isoamyl, isopropyl, and octyl alcohols, as well as 2-ethyl butanol, hexanol, heptanol, and heptadecanol, and ethers such as di-ethylene glycol ethyl ether, ethylene glycol butyl ether and ethylene glycol ethyl ether, which are sold, respectively, under the trade-names Carbitol, Cellosolve, and Butyl Cellosolve by the Carbide and Carbon Chemicals Corporation. There may be used also various other organic solvents, e. g., ketones, such as acetone; esters, such as methyl and ethyl acetate; and chlorinated hydrocarbon solvents such as chloroform and carbon tetrachloride. We have found that in some cases methyl acetate gives especially good results. Generally speaking, such solvents may be used singly or in combination.

For most purposes we prefer to use organic solvents which possess at least some miscibility with water, at least where aqueous solutions of reagents, such as chloric acid and hydrogen peroxide are used. We have found, thus, that, in most cases, the solvent need not be anhydrous, and that the benefits of the invention are realized even if substantial amounts of water, even as much as 50 per cent of the liquid content of the carroting agent are present, in this organic solvent. Not only is water necessary for the action of some agents, but peculiarly enough, the troubles encountered in pot carroting prior to our invention are not encountered with the organic solvent carrots of this invention under such circumstances, nor are the desirable results affected appreciably, as far as we have determined, by moisture in the fibers being treated. Preferably, however, we keep the water content of the carrots as low as is economically feasible.

The invention resides in the use of such solvents for dissolving carroting reagents, and in carroting with such compositions, rather than in providing specific carroting reagents, and we have found that in the practice of this invention we can use most, if not all, of the wide variety of carroting agents. Thus, we have satisfactorily used in solvents in accordance with the invention such combinations, among others, as (1) chloric acid, sulphuric acid and hydrogen peroxide, (2) sulphuric acid and hydrogen peroxide, (3) nitric acid and hydrogen peroxide, (4) sulphuric acid, phosphotungstic acid and hydrogen peroxide, (5) nitric acid and quinone, (6) nitric acid and iodine, (7) sulphuric acid and bromine. Other carroting reagents which we have used successfully, singly or in appropriate combination are, acetic acid (glacial), butyl hydroperoxide, mercury, mercuric nitrite, sodium peroxide, acetyl chloride, trichloracetic acid, sodium nitrate, formalin, urea peroxide, hydroquinone, and sodium hydroxide. Although it is not necessary in all cases, we prefer for most purposes to use both a hydrolyzing and an oxidizing agent.

The proportions of the reagents to be used in the organic solvent solutions will, of course, vary widely in accordance with the particular reagent or combinations of reagents, the solvent, the amount of water, if any, present, the fiber which is being treated, the conditions of treatment, and related factors, as will be clear to those skilled in the art, so that numerical proportions applicable to all cases can not be stated. The wide applicability of the invention to various reagents, solvents and proportions is indicated in the examples which follow.

Although the invention is applicable to hand carroting, it is especially adapted to pot carroting and may therefore be described with reference to such practices. In accordance with the method provided the loose fur is immersed in a solution of the type described above and is allowed to remain for a sufficient length of time to develop the desired felting qualities. The fur is then drained and separated from excess solution, preferably by centrifuging it, after which it is dried. The fiber can be carroted once in this way or it can be given successive treatments with the same or different reagents. For example, fur can be carroted first in nitrous acid followed by quinone, both being, of course, in an organic solvent.

We find by extended experience that in this manner satisfactory felting qualities are developed, even with wool and various grades of fur that have heretofore been waste materials as far as concerns felt hat manufacture, and that there is no appreciable tendency for the fibers to felt or mat in the solution, or for concentration of the reagents in drying with damage to the fibers such as has been encountered in previous pot carroting procedures. Particularly, carded wool does not kink, nor is its harshness increased, and its felting properties are developed to a point where standard fur felting procedures for making hats are applicable to wool treated in this manner. The process is further widely applicable to furs, including both wastes of the hat and fur trade and also furs that could be used only in small amounts because of their poor felting properties, however carroted. Thus, we have treated satisfactorily such diverse materials as podgum and blown coney waste, as well as raw blown muskrat. Muskrat is highly desirable because of its extreme softness, but only small amounts could be used heretofore because of its low felting power. Treated by the present process its felting power is increased substantially.

The utility of the invention and the wide scope of carroting agents and solvents in accordance with the invention may be exemplified by reference to actual tests in which various types of loose fur were subjected to pot carroting in accordance with the invention. In most of these tests a weighed amount of fur was formed into a circular swatch of about 70 mm. diameter in a manner generally similar to actual fur felt hat manufacture. The swatches were then subjected to hardening and shrinking treatment on an apron machine which is designed to simulate the hardening and shrinking operations of fur felt hat production. The reduction in diameter from its original size to the size after a measured number of manipulations in the machine gives a measure of the felting power. Thus, the designation 50/100 means that after 100 manipulations the swatch has been reduced to 50 mm. in diameter. Unless stated otherwise, in these tests the standard practice was to use 20 grams of loose fur for each 200 cc. of solvent, and the fur was immersed in the solution for 20 minutes after which it was centrifuged for 15 minutes and dried 90 minutes at 65° to 75° C. The carroting solution was at the ambient temperature and varied from about 25° to 35° C. In the following tests the felting rates reported as a result of the foregoing swatch test are acceptable for felt hat making. Among the loose fur materials (fur separated from the skin) that are available is that known to the trade as podgum. This is a by-product fur which is collected from the liquors in the Genest "A" and "B" sizing machines. Very large quantities are available but it has not been utilizable in the making of high grade felt hats because it lacks felting power, and it could not be pot carroted satisfactorily prior to the present invention for reasons reviewed above. Consequently, podgum has for the most part been thrown away. The following tests show that podgum can not only be pot carroted satisfactorily by the present invention but also that substantial amounts of it can be used in mixtures used for hat making, which is obviously of major advantage to the industry.

In the following tests the reagents used were in all cases of the following strength or purities: hydrogen peroxide, 100 volume, equal to 13% by weight of active oxygen; chloric acid, 10.3%; sulphuric acid, 1.84 specific gravity; nitric acid, 1.42 specific gravity; acetic acid, glacial; butyl hydroperoxide, anhydrous; formalin, 40% solution of formaldehyde; urea peroxide, anhydrous; methanol, 99.85%; ethanol, denatured 95%; isopropyl alcohol refined 98–99%; n-butyl alcohol, anhydrous. The other reagents such as phosphotungstic acid, sodium nitrite, quinone, sodium peroxide, and the like, were the customarily chemically pure (C. P.) or reagent quality. The solvents such as butyl Cellosolve, Carbitol and Cellosolve were of the grade customarily supplied by Carbide and Carbon Chemicals Corp., while solvents such as xylene, chloroform, and the like, were of standard reagent quality.

In one series of tests there was used a podgum which without carroting felted so poorly as to be useless even as a minor ingredient of hat making mixtures. In one test this podgum was pot carroted in a solution of 750 cc. of chloric acid ($HClO_3$, 10.3% strength) and 1500 cc. of hydrogen peroxide ($H_2O_2$, 100 volume or 13% available $O_2$) in 4 gallons of ethyl alcohol. The felting rate was 62/100. Hats were made from a mixture of 50 per cent of a mixture known as "pearl crush" and 50 per cent of this carroted podgum, and the hats were rated as being of very good quality.

The production of these hats illustrates a striking and exceptionally important feature of the invention, namely, that felts which include substantial amounts of fur treated in accordance with the invention tend to be self-healing if holes form during the early stages of shrinking. Thus, in making these hats holes formed in some of them after three rounds on the apron settler, but they disappeared during the subsequent operations. In standard practice using hand carroted fur such holes would not disappear and felts containing them would necessarily have to be discarded with consequent increased operating cost. The importance of this tendency to self-heal can thus scarcely be over emphasized.

In another test the same podgum was pot carroted in a solution of 75 cc. of chloric acid, 150 cc. of hydrogen peroxide, and 20 cc. of sulfuric acid (sp. gr. 1.84) in 1500 cc. of ethyl alcohol. The felting rate of the dried fur after carroting was 58/100.

Particularly good felting qualities were developed by pot carroting this podgum in a solution of 1 gram of phosphotungstic acid, 5 cc. of sulfuric acid, and 20 cc. of hydrogen peroxide in 200 cc. of ethyl alcohol. The swatches showed a felting rate of 59/100.

Hats of good quality were made also from this podgum pot carroted in a solution of 570 cc. of chloric acid, 150 cc. of sulfuric acid, and 1140 cc. of hydrogen peroxide in 3 gallons of ethyl alcohol. The hats were made from a mixture of 25 per cent of the carroted podgum, whose swatches showed a felting rate of 62/100, and 75 per cent of pearl crush mixture.

By substituting isopropyl alcohol or mixtures of isopropyl and methyl alcohols for ethyl alcohol similar results were obtained with the sulfuric acid—chloric acid—hydrogen peroxide carrots. Good swatches were produced also from podgum pot carroted with a solution of 7 cc. of nitric acid (sp. gr. 1.42), 5 grams of quinone, and 10 cc. of hydrogen peroxide in 200 cc. of ethyl alcohol.

In another series of tests a podgum which did not felt was pot carroted in a solution of 2 cc. of sulfuric acid, 10 cc. of chloric acid and 20 cc. of hydrogen peroxide in 200 cc. of ethyl alcohol. After treatment satisfactory felting took place. Comparable results were obtained by replacing the ethyl alcohol of that solution with isopropyl alcohol and with a mixture of 100 cc. of isopropyl alcohol and 100 cc. of methyl alcohol.

Podgum from another source was pot carroted in a solution of 380 cc. of chloric acid, 100 cc. of sulfuric acid and 760 cc. of hydrogen peroxide in 2 gallons of ethyl alcohol. One dozen hats were made using 75 per cent of a pearl crush mixture and 25 per cent of the treated podgum. The felting rate was normal for the pearl crush mixture alone and the quality of the hats was satisfactory. The same untreated podgum was pot carroted in a solution of 950 cc. of chloric acid, 250 cc. of sulfuric acid and 1900 cc. of hydrogen peroxide in 5 gallons of ethyl alcohol. Three dozen hats were made from a mixture of 25 per cent of the carroted podgum with 75 per cent of a pearl crush mixture. These were dyed Dune, Freedon Blue and Caribou. The felting rate was normal and the hats were judged to be of equal quality with those made from the regular pearl crush mixture without podgum.

In yet another series of tests raw cleared entire coney was used which without treatment exhibited a felting rate of 57/100, 50/180. By pot carroting that fur in a solution of 75 cc. of chloric acid, 150 cc. of hydrogen peroxide, and 75 cc. of sulfuric acid in 1500 cc. of ethyl alcohol the felting rate became 50/100, which is commercially acceptable, and the swatches were of very good quality.

Tests with this coney demonstrated also the fact that the temperature and time of treatment, and the time of drying, are not critical provided the fur is treated for a sufficient length of time and the temperature is not high enough to cause damage.

In one series of test there was used a solution of 75 cc. of chloric acid and 150 cc. of hydrogen peroxide in 1500 cc. of ethyl alcohol. Separate batches of the fur were treated in separate equal portions of the solution at 25° C., 35° C. and 55° C., after which they were centrifuged 1 minute and then dried during 1¼ hours at 65° to 70° C. The swatches produced uniformly showed a felting rate of 55/100, 50/150, and the quality was uniformly good. This shows that the temperature of the carroting solution may vary within reasonable limits and that there is no particular advantage in using temperatures above normal room temperature.

In another series of tests separate batches of the same fur were treated 15 minutes in separate equal amounts of the same solution at 35° C., after which they were centrifuged for 1 minute. One of these was dried 20 hours at 35° C., another 2½ hours at 50° to 55° C., a third 1¼ hours at 65° to 70° C., and a fourth 30 minutes at 105° C. The felting rates of the dried furs showed that the time and temperature of drying is without critical effect.

In yet another series of tests separate batches of this fur were treated 15 minutes at 35° C. and they were then centrifuged at constant speed for periods of 30 seconds, 1 minute, 2 minutes, 5 minutes and 10 minutes. The felting rates of the dried fur showed that at the R. P. M. used centrifuging of 5 minutes is desirable but that further extension of the time is without material effect.

In another series of tests the same solution was used and separate batches of the coney were treated in separate equal amounts of the solution at 35° C. for periods of time and with resultant felting rates as shown in the following table.

| Treating time | 5′ | 15′ | 30′ | 1 hr. | 2 hrs. | 4 hrs. | 18 hrs. |
|---|---|---|---|---|---|---|---|
| Felting rate | 55/100 | 56/100 | 55/100 | 55/100 | 54/100 | 55/100 | 54/100 |
| | 50/150 | 50/160 | 50/120 | 50/150 | 50/140 | 50/150 | 50/140 |

As indicating the applicability of other carroting reagents, the same coney was pot carroted in a solution of 2 grams of sodium nitrite (NaNO$_2$) and 5 cc. of sulfuric acid in 200 cc. of ethyl alcohol (giving a nitrous acid carrot). The felting rate was 54/100, 50/140, and the quality of the felted swatches was good. Particularly good swatches weer produced by pot carroting this coney in a solution of 5 cc. of nitric acid (sp. gr. 1.42) and 5 grams of quinone in 200 cc. of ethyl alcohol. The felting rate was 54/100, 50/120.

A blown and dusted coney waste was also pot carroted in a solution of 950 cc. of chloric acid, 250 cc. of sulfuric acid and 1900 cc. of hydrogen peroxide in 5 gallons of ethyl alcohol. One dozen hats were made from a mixture of 25 per cent of the carroted fur and 75 per cent of pearl crush mixture. The felting rate was normal for that of the pearl crush mixture alone, and the quality and weight of the finished hats was good.

As indicated above, muskrat fur is highly desirable for hat manufacture from the standpoint of conferring softness to the touch but it has not been possible to use more than very small amounts because of the poor felting rate. As exemplifying this, in a series of tests there was used raw blown muskrat XB which when blown to form a standard swatch and subjected to standard treatment produced a very loose and weak swatch in which no substantial felting had occurred. By pot carroting in a solution of 75 cc. of chloric acid and 150 cc. of hydrogen peroxide in 1500 cc. of ethyl alcohol the felting rate was improved to such an extent that the treated swatch was 59 mm. diameter. A hat made from a mixture of 50 per cent of pearl crush mix and 50 per cent of this treated muskrat fur was light in weight but strong, and it was pleasing to the touch. A still greater felting rate was produced by the use of a solution of 2 grams of phosphotungstic acid, 5 cc. of sulfuric acid and 20 cc. of hydrogen peroxide in 200 cc. of ethyl alcohol.

Blown beaver light E, another by-product of the fur industry, showed a felting rate of 66/100 without treatment. After being carroted in a solution of 2 cc. of sulfuric acid, 10 cc. of chloric acid and 20 cc. of hydrogen peroxide in 200 cc. of ethyl alcohol its felting rate was 58/100.

Particularly striking results are to be had through the application of the invention to the carroting of wool. In these tests the ratio of wool to solvent and the treating conditions were the same as in the fur tests, and the wool contained about 8 per cent of moisture, unless stated otherwise. A wool which showed a felting rate of 62/100 and which could not be used for the manufacture of hats according to fur felt practice was pot carroted in a solution of 150 cc. of chloric acid, and 300 cc. of hydrogen peroxide in 3000 cc. of ethyl alcohol. Its felting rate was then 52/100, 50/130, and it did not kink as a result of the carroting. The felting rate of this treated wool was sufficient for the making of hats according to fur felt procedure. The hats formed nicely and shrinkage was good.

The fact that the organic liquid solvent can be varied widely in the practice of the invention was demonstrated clearly by a series of tests on wool in which 10 cc. of water, 10 cc. of chloric acid and 20 cc. of hydrogen peroxide were dissolved in 200 cc. of the following solvents: methyl, ethyl, isopropyl and butyl alcohols, acetone, ethyl acetate, Butyl Cellosolve and Carbitol. Although the greatest shrinking rate was obtained with the reagents dissolved in butyl alcohol and Butyl Cellosolve, in each instance the felting rate was of the same order of magnitude and was suited to hat manufacture. This was demonstrated likewise with another reagent, namely, 20 cc. of acetic acid (glacial) and 20 cc. of butyl hydroperoxide in 200 cc. of the following solvents: carbon tetrachloride, Solvesso and xylene. In each instance the wool showed a felting rate of 55/100, 50/150, which is adequate for the application of fur felt hat procedures.

A felting rate of 52/100, 50/120 was exhibited by wool that was carroted in a solution of 5 cc. of sulfuric acid, 5 grams of phosphotungstic acid and 20 cc. of hydrogen peroxide in 20 cc. of ethyl alcohol. A very good swatch showing a felting rate of 53/100, 50/130 was produced from wool pot carroted in a solution of 5 cc. of nitric acid and 10 grams of quinone in 200 cc. of ethyl alcohol, and similar results were obtained by the use of a solution in which the quinone was replaced by an equal weight of iodine.

Swatches showing an exceptionally high felting rate of 50/80, 48/100 were produced by the use of a solution of 10 cc. of chloric acid, 2 cc. of sulfuric acid, 20 cc. of hydrogen peroxide, and 10 cc. of water in 190 cc. of methyl acetate. Pot carroting in a solution of 5 cc. of nitric acid, 5 grams of phosphotungstic acid and 20 cc. of hydrogen peroxide in 200 cc. of ethyl alcohol increased the felting rate of wool so that swatches felted at 52/100, 50/120.

The wide applicability of reagents is indicated by the following solutions which, among others, have been used to pot carrot wool with production of satisfactory felting rates which are high enough to permit the making of hats by fur felt practice:

1. 1 gm. Hg
10 cc. $HNO_3$
200 cc. EtOH

2. 1 gm. Hg
10 cc. $HNO_3$
20 cc. $H_2O_2$
200 cc. EtOH

3. 20 cc. $H_2O$
0.1 gm. $Na_2O_2$
200 cc. EtOH

4. 5 gm. $NaNO_2$
5 cc. $H_2SO_4$
200 cc. EtOH
Treat, dry, then treat with
5 gm. quinone
200 cc. EtOH

5. 5 gm. quinone
5 cc. $H_2SO_4$
200 cc. EtOH

6. 5 gm. urea peroxide
5 cc. $H_2SO_4$
200 cc. MeOH

7. 3 gm. iodine
200 cc. $CHCl_3$

8. 40 cc. formalin
5 cc. $H_2SO_4$
200 cc. EtOH

9. 2 cc. NaOH (30% sol. in $H_2O$)
30 cc. $H_2O_2$
300 cc. EtOH

10. 80 cc. formalin
5 cc. $H_2SO_4$
160 cc. EtOH

11. 30 cc. $H_2O_2$
2 cc. $H_2SO_4$
300 cc. EtOH

In none of the foregoing tests did the wool resume its natural kinkiness; this is important from the hat manufacturer's standpoint.

Tests have demonstrated also that the moisture content of the wool, at least up to about 30 per cent, is without appreciable effect on the results so that it is unnecessary to dry the wool before pot carroting it.

Although the invention is applicable generally to the carroting of animal fibers, and particularly to pot carroting them, we find, at least in many instances, that bleached furs are not improved, apparently because of damage to the fibers in the bleaching operation.

For most purposes we prefer that the pH of treated fur shall be from about 2.0 to 2.5. This is determined readily by mixing 2 grams of fur with 100 cc. of distilled water and allowing it to stand in a bottle for 12 to 18 hours and then determining the pH of the water extract using a glass electrode.

From what has been said it will be understood that the term "pot carroting" used in the appended claims contemplates the carroting of loose fur or other animal fibers by immersion in the carroting solutions described, as contrasted with the application of a carroting solution by brushing or spraying.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. That method of pot carroting loose animal fibers which comprises immersing the loose fibers in a solution of an oxidizing agent and a fiber-hydrolytic agent in an organic solvent containing not over about 50 per cent of water, removing excess solution from the treated fibers, and then drying the fibers, and thereby producing nonkinked and unmatted fibers of improved felting rate.

2. A method according to claim 1, said fiber being fur.

3. A method according to claim 1, said fiber being wool.

4. A method according to claim 1, said solution being in the proportions of about 200 cc.

of 95 per cent of ethyl alcohol, 10 cc. of 10.3 per cent chloric acid, 2 cc. of 1.84 sp. gr. sulfuric acid, and 20 cc. of 100 volume hydrogen peroxide.

5. A method according to claim 1, said solution being in the proportions of about 200 cc. of 95 per cent ethyl alcohol, 5 cc. of 1.84 sp. gr. sulfuric acid, 2 grams of phosphotungstic acid, and 20 cc. of 100 volume hydrogen peroxide.

6. A method according to claim 1, said solution being in the proportions of about 200 cc. of 95 per cent ethyl alcohol, 7 cc. of 1.42 sp. gr. nitric acid, 5 grams of quinone, and 10 cc. of 100 volume hydrogen peroxide.

7. A method according to claim 1, said solvent being substantially water-free.

8. A method according to claim 1, said fibers being substantially dry, and said solvent being substantially water-free.

9. That method of pot carroting loose animal fibers which comprises immersing the loose fibers in a solution of sulfuric acid, chloric acid, and hydrogen peroxide in an organic solvent, the solution containing not over about 50 per cent of water, removing excess solution from the treated fibers, and then drying the fibers, and thereby producing non-kinked and unmatted fibers of improved felting rate.

ALFRED E. HODSHON.
HAROLD H. TUCKER.